March 3, 1959  W. J. SWAIN ET AL  2,875,888
BELT CONVEYOR AND DRIVE THEREFOR
Filed Jan. 13, 1956  4 Sheets-Sheet 1

INVENTOR.
William J. Swain and
BY Rubin D. Garnett.
Fishburn and Gold
ATTORNEYS.

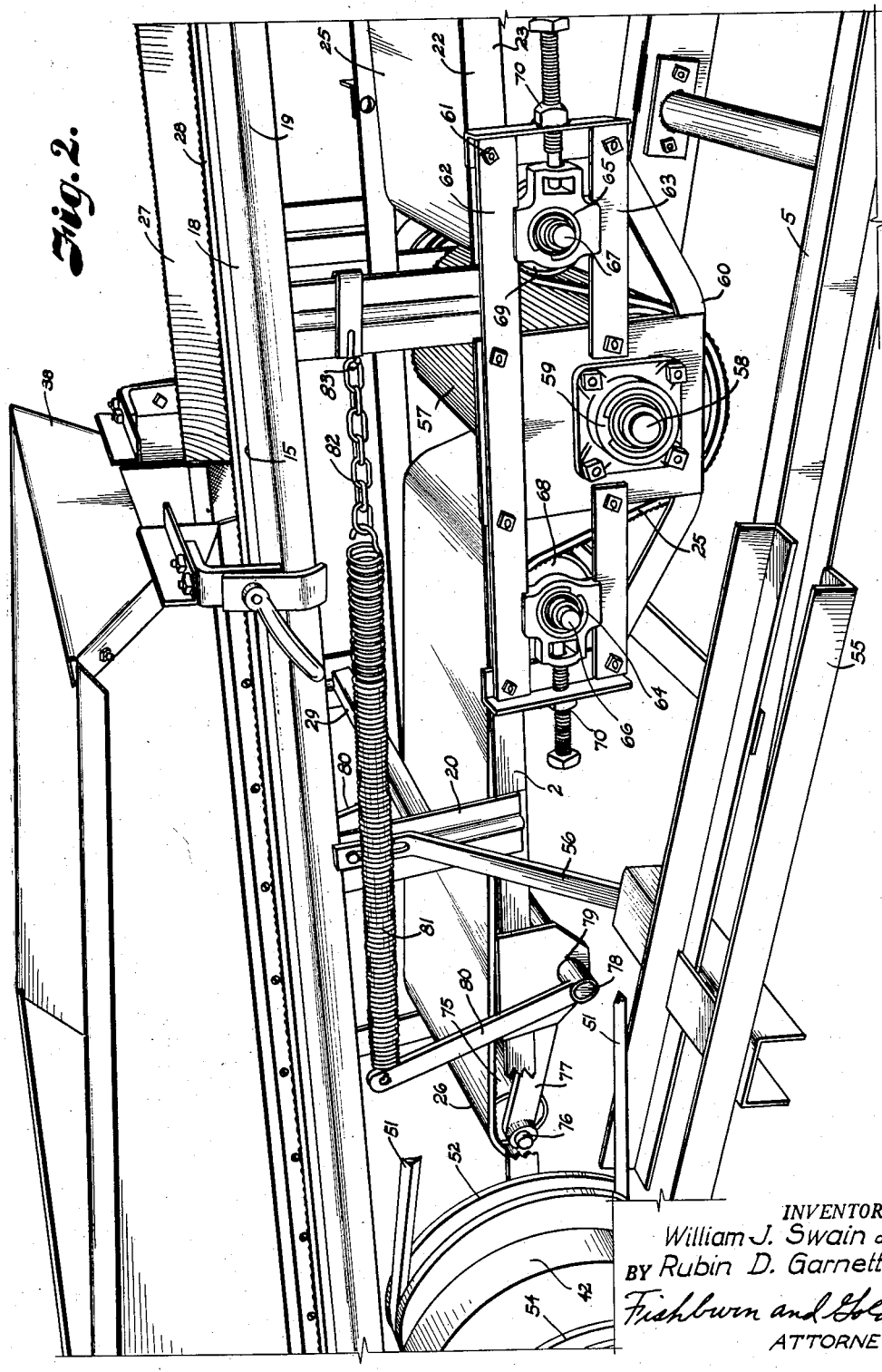

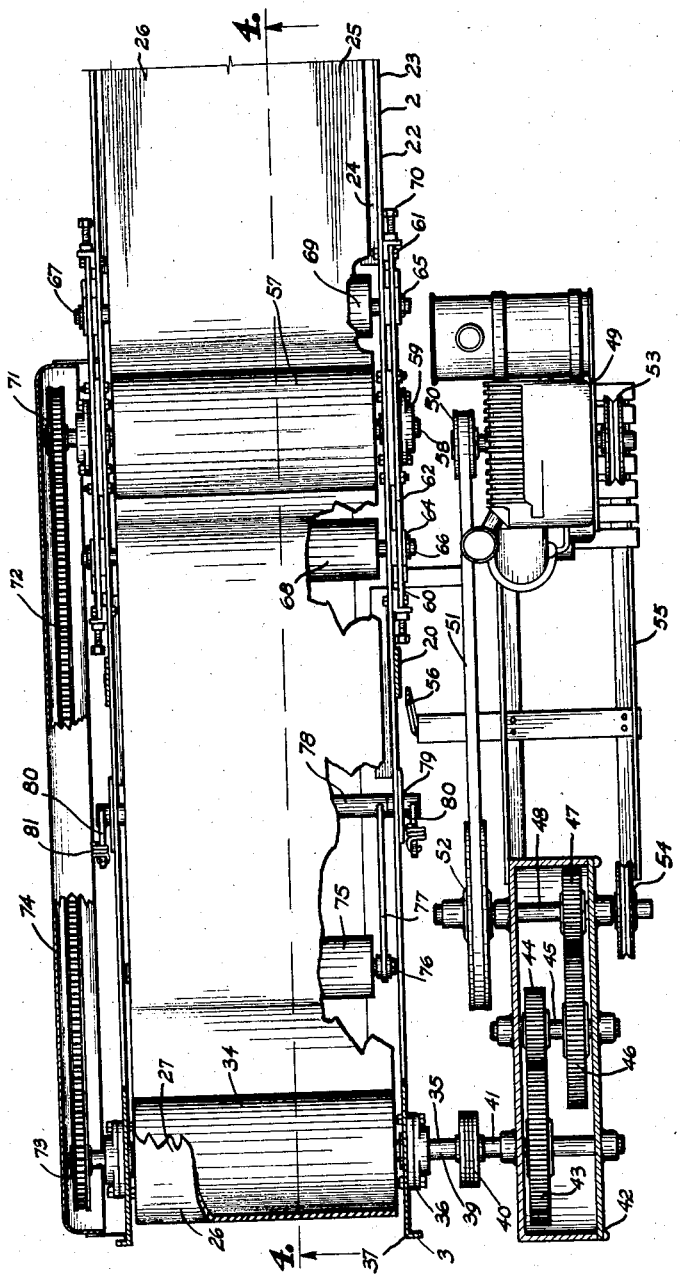

March 3, 1959  W. J. SWAIN ET AL  2,875,888
BELT CONVEYOR AND DRIVE THEREFOR
Filed Jan. 13, 1956  4 Sheets-Sheet 4
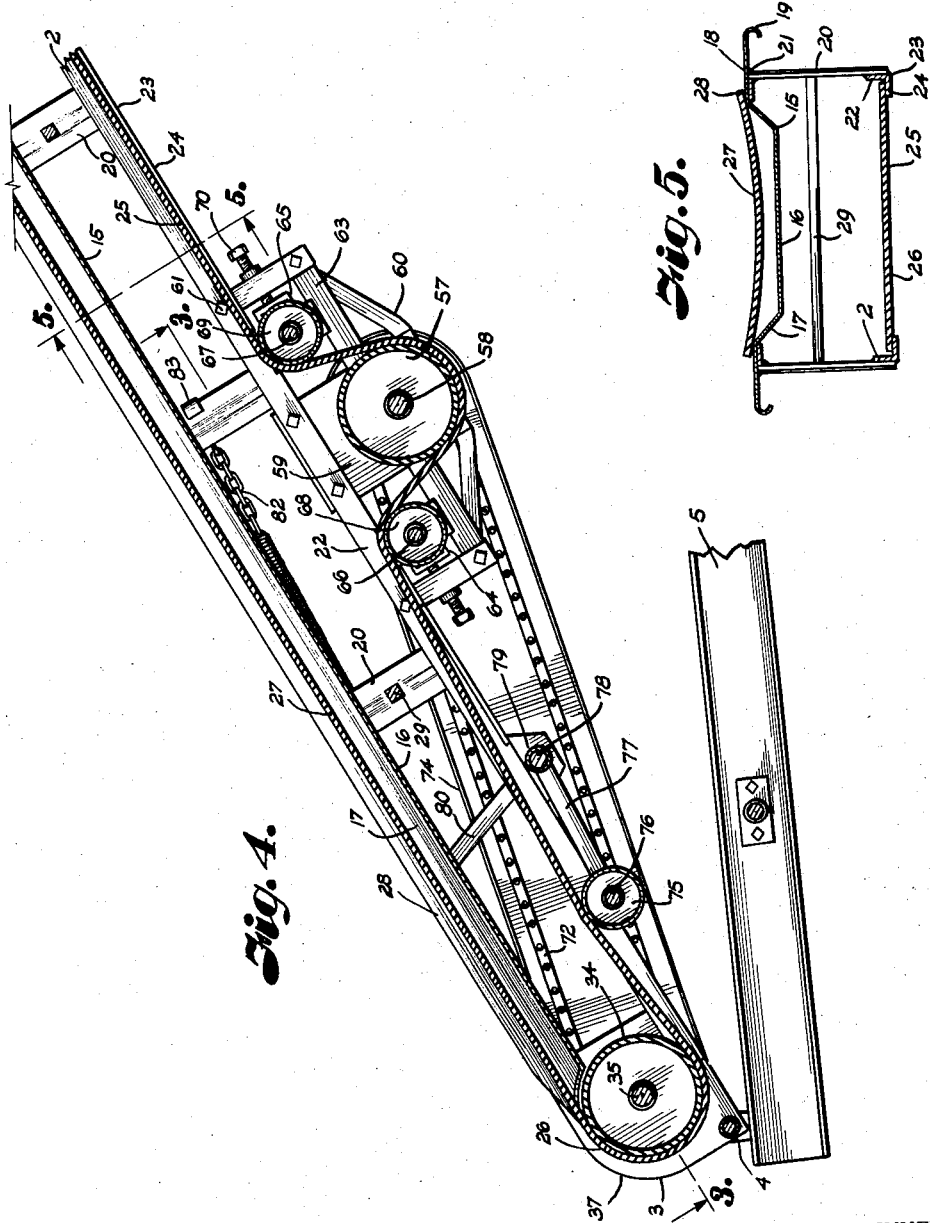
INVENTOR.
William J. Swain and
BY Rubin D. Garnett.
Frishburn and Gold
ATTORNEYS.

2,875,888
BELT CONVEYOR AND DRIVE THEREFOR

William J. Swain, Mission, Kans., and Rubin D. Garnett, Lee's Summit, Mo., assignors to Sam Mulkey Company, Lee's Summit, Mo., a corporation of Missouri Application January 13, 1956, Serial No. 558,870

2 Claims. (Cl. 198—203)

This invention relates to conveyors, and more particularly, to endless belt conveyors and drives therefor for moving and elevating material.

Portable elevators of the endless conveyor type usually include an elongate boom or frame carried on a wheeled undercarriage which may be attached to a vehicle or the like for transportation from one point to another. In such structures, the boom or frame may be elevated to various inclinations for delivering material to any suitable delivery point; however, belt type conveyors stretch under load and usually present driving problems due to limited space available in the boom for the upper and lower runs and necessarily small size of pulleys over which the belt operates. It is commonly recommended that belt conveyor drive pulleys be of a diameter not less than the width of the belt and even with that size pulley it is common practice to use an idler or snubbing pulley arranged to force the belt into a greater arc of contact with the drive pulley, and also rubber lagged pulleys to provide increased frictional grip and furnish more power with less danger of slipping of the belt. Also, belts of additional plys have been used for transmission of additional tension needed for sufficient frictional grip in efforts to overcome the driving problems of the belt conveyors.

The objects of the present invention are to provide a belt conveyor and drive which avoid the above-mentioned difficulties; to provide a positive belt conveyor drive with substantial driving contact of the belt on a plurality of drive pulleys without differential slippage therebetween; to provide such a drive that is secured to the boom in a manner to offer substantially no interference with the undercarriage; to provide a drive wherein conveyor belts of minimum plys may be used thereby reducing the original and replacement cost of the belts; to provide such a drive in which the diameter of the drive pulleys may be less than the width of the belts; to provide a belt conveyor drive with a slack take-up or snubbing pulley between two drive pulleys to substantially equalize the pressure of the belt on said drive pulleys; to provide such a drive wherein the drive pulleys are positively connected for uniform peripheral speed; and to provide a belt conveyor and drive that is economical to manufacture, sturdy, compact and capable of efficient, substantially trouble-free operation.

In accomplishing these and other objects of the present invention, we have provided improved details of structure, the preferred forms of which are illustrated in the accompanying drawings, wherein:

Fig. 2 is an enlarged detailed perspective view of a portion of the drive of the conveyor belt.

Fig. 3 is a sectional view through the lower portion of the conveyor taken on the line 3—3, Fig. 4.

Fig. 4 is a longitudinal sectional view through the conveyor on the line 4—4, Fig. 3.

Fig. 5 is a transverse sectional view through the conveyor on the line 5—5, Fig. 4.

Figure 1:
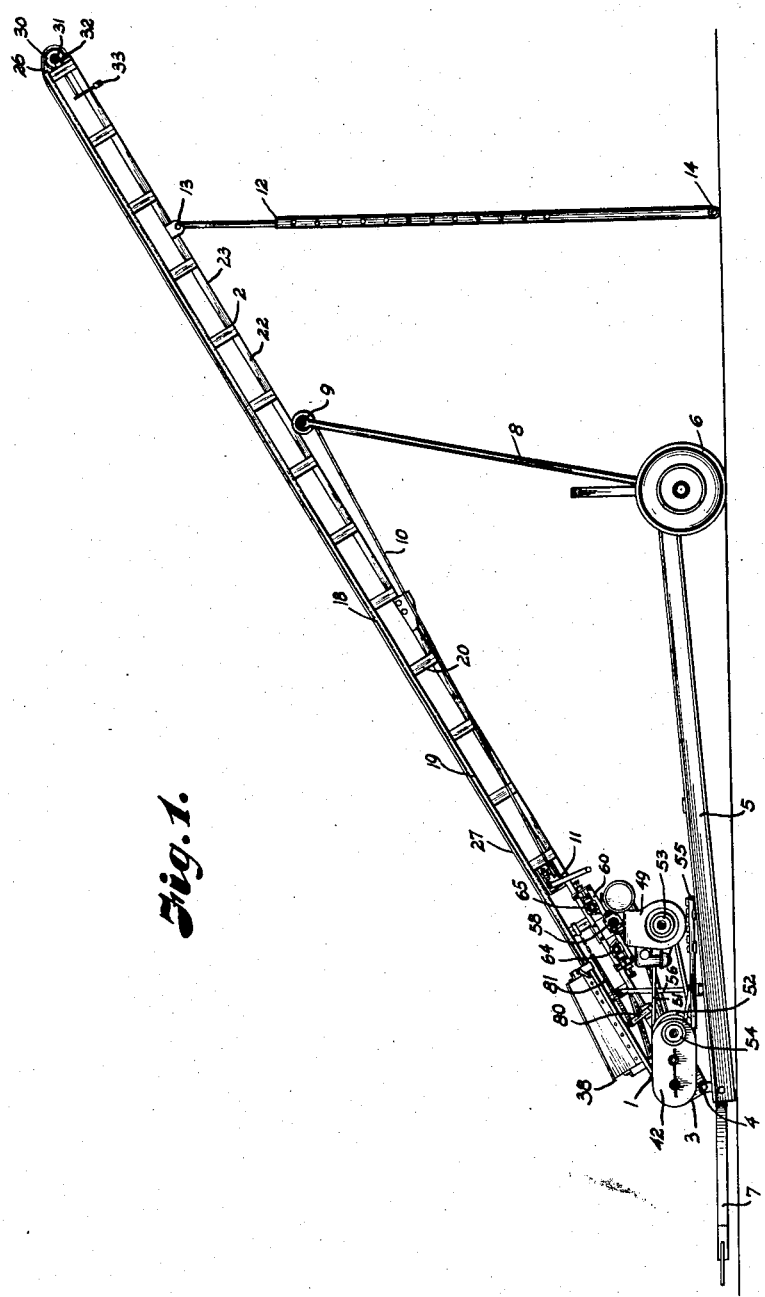
Fig. 1 is a side elevation of a portable belt conveyor embodying the features of the present invention.

Referring more in detail to the drawings:

1 designates a conveyor consisting of an elongate boom or frame 2 having a lower end 3 pivotally mounted as at 4 on one end of an undercarriage 5. Ground-engaging wheels 6 are rotatably mounted on the other end of the undercarriage for cooperation with a tongue or the like 7 connected to said one end of the undercarriage and adapted to be connected or otherwise hitched to a vehicle for transporting the conveyor from one place of work to another. A suitable strut such as an A-frame 8 has its lower end pivotally mounted on the ends of the undercarriage adjacent the wheels 6 and the other end provided with rotatably mounted flange type wheels 9 adapted to rollingly engage the boom or frame 2. A suitable cable 10 has one end connected to the upper end of the strut 8 and the other end wound on a winch assembly 11 whereby operation of the winch assembly swings the strut 8 on the undercarriage to raise or lower the boom or frame 2 and adjust the inclination of same. An extensible support 12 is pivotally connected as at 13 to the boom between the strut 8 and the upper end of the boom and has a lower end 14 adapted to engage the ground or other supporting surface to aid the strut 8 in supporting the upper portion of the boom.

The boom 2 includes an open top trough 15 preferably formed of suitable sheet metal and extending substantially the full length of the boom. The trough has a flat central portion 16 provided with upwardly and outwardly sloping sides 17 terminating in outwardly extending flanges 18 having downwardly turned or rolled outer side edges 19, each side of the trough member preferably being substantially identical. A plurality of posts 20 are spaced longitudinally along the boom and have their upper ends suitably secured as at 21 to the underside of the flanges 18, said posts depending from said flanges and having their lower ends connected to vertical legs 22 of angles 23 which extend longitudinally of the boom for substantially the length thereof and have inwardly directed legs 24. The angles 23 are suitably spaced whereby the legs 24 serve as guiding supports for the lower run 25 of a conveyor belt 26, the upper run 27 being positioned over the trough member 15 in such a manner that the side edges 28 of the upper run overlie portions of the flanges 18 with a center portion of the upper run curving downwardly over the center portion of the trough. With this construction, the trough member 15 serves as a support for the upper run 27 and it provides what is commonly termed "a troughing run of the belt conveyor." Suitable cross bracing 29 is arranged between the posts 20 at intervals along the length of the boom to provide a lightweight, strong, rigid structure that maintains the angles 23 substantially parallel for efficient support of the lower run of the belt.

The upper end of the belt 26 operates over a suitably crowned pulley 30 mounted on a shaft 31 rotatably carried in bearings 32 supported on the upper end of the boom 2, the pulley being of such a size that the conveyor belt extends from the upper end of the trough 15 around the pulley and is guided thereby onto the angles 23 that form the lower run support. A scraper 33 is preferably arranged adjacent the upper end of the boom to engage the outer face of the lower run of the conveyor belt to remove material tending to adhere to the belt. The lower end of the conveyor belt preferably operates over a suitably crowned and lagged lower pulley 34 carried on a shaft 35 that is rotatably supported in bearings 36 mounted on side extensions 37 extending from the lower end of the trough 15 and also connected to the lower ends of the angles 23. A hopper 38 may be suitably mounted on the lower portion of the trough above the conveyor belt for receiving material and delivering same to the upper run of the conveyor belt which is preferably of a multiple ply type having a rough top or outer face.

The shaft 35 preferably extends outwardly from the bearings 36, one end 39 of the shaft being connected by an adjustable slip clutch 40 to a shaft 41 which extends from a speed reducer housing 42. In the illustrated structure, the speed reducer includes a gear 43 fixed on the shaft 41 and meshing with a gear 44 fixed on a shaft 45 rotatably mounted in the housing in spaced relation to the shaft 41. A gear 46 is also fixed on the shaft 45 and meshes with a gear 47 fixed on a shaft 48 rotatably mounted in suitable bearings in the housing with the ends of the shaft 48 extending from the housing. The shaft 48 is drivingly connected to a prime mover 49. In the illustrated structure, the prime mover is an engine with a sheave 50 fixed on the crankshaft and operatively connected by a belt 51 to a sheave pulley 52 mounted on the shaft 48. Sheave pulleys 53 and 54 are shown on the other ends of the crankshaft and speed reducer shaft 48 respectively for providing a different speed of drive if desired. Speed reducer housing 42 and prime mover 49 are supported on a platform 55 in such a manner that the platform and speed reducer are pivoted about the axis of the shaft 35 and the platform is adjustably connected by an arm 56 to the boom whereby the prime mover may be leveled regardless of the inclination of the boom.

The spacing between the angle legs 24 and the trough 15 are necessarily limited and the lower pulley 34 is accordingly limited in diameter, usually very substantially less in diameter than the width of the conveyor belt, as for example, in the illustrated structure said pulley is less than one-half the width of the belt and has arcuate engagement with the belt of substantially 180°. Additional drive of the belt is provided by a pulley 57 arranged below the boom as illustrated in Fig. 4. The pulley 57 is carried on a shaft 58 which is rotatably mounted in bearings 59 supported in frames 60 at each side of the boom or frame.

The frames 60 are preferably secured by suitable fastening devices such as bolts and nuts 61 to the angles 23 and include longitudinal guide rails 62 and 63 extending from the bearings 59 toward the upper and lower ends of the boom whereby said rails slidably support bearing members 64 and 65 which rotatably mount transverse shafts 66 and 67 respectively that carry idler pulleys 68 and 69. Suitable adjusting screws or the like 70 are arranged in the frame 60 in engagement with the bearing members 64 and 65 to adjust the idler pulleys 68 and 69 toward and away from the drive pulley 57. The flange 24 of the angles 23 is removed for substantially the length of the frame 60 whereby the lower run of the conveyor belt extends over the idler or snubbing pulley 69 under the drive pulley 58 and over the idler or snubbing pulley 68 and then to the lower pulley 34. Adjustment of the pulleys 68 and 69 varies the tension on the conveyor belt and also varies the area of contact of the belt with the drive pulley 57, the arc of engagement of the conveyor belt with the drive pulley 57 being substantially 180° whereby the combined driving engagement of the pulleys 34 and 57 is substantially 360°.

The drive pulley 57 is preferably the same diameter as the drive pulley 34, and the shaft 58 is positively and operatively connected with the shaft 35 to provide a uniform rotation and peripheral speed of the pulleys 34 and 57. In the illustrated structure, the shaft 58 extends laterally of the boom and on the opposite side of the prime mover 49. A sprocket 71 is fixed on the end of the shaft and is operatively connected by a chain 72 to a sprocket 73 which is identical in size and number of teeth with the sprocket 71, said sprocket 73 being fixed to the shaft 35. A housing 74 preferably encloses the chain to protect personnel from contacting same.

The bearings 64 and 65 at each end of the shafts 66 and 67 are individually adjustable to provide proper tracking of the belt on the various pulleys. The conveyor belt stretches under load, the stretch varying with the load, and an automatic take-up of the belt is provided between the drive pulleys 57 and 34. In the illustrated structure, the take-up consists of an idler pulley 75 rotatably mounted on a shaft 76 carried in the ends of arms 77 the other ends of which are fixed on a transverse shaft 78 rotatably mounted in bearing brackets 79 depending from the angles 23. Arms 80 are fixed to each end of the shaft 78 and extend upwardly therefrom with the upper ends of said arms connected to springs 81 which extend therefrom toward the drive pulley 57. The ends of the spring 81 are connected to links of chain 82 adapted to be adjustably connected to suitable fastening means such as hooks 83 fixed to the boom whereby changing the link of the chain engaged with the hook varies the tension on the springs 81, the tension of the springs urging the idler pulleys 75 into engagement with the outer or lower face of the lower run of the belt to maintain the tension on the portion of the conveyor belt between the drive pulleys 57 and 34.

In using a conveyor constructed and assembled as described, the conveyor is moved to a desired location and the winch assembly 11 operated to raise the strut 8 to effect proper inclination of the boom 2, and the upper end of the boom is positioned for desired delivery. The extensible support 12 is then adjusted to aid in support of the upper end of the boom. The prime mover 49 is then started to drive the speed reducer to rotate the shaft 35 which rotates the lower drive pulley 34 and through the chain 72 rotates the drive pulley 57 at the same speed. The positions of the idler pulleys 68 and 69 are adjusted to effect proper tracking of the conveyor belt on the various pulleys and also to adjust the tightness of the conveyor belt, and the springs 81 are adjusted whereby the tension of the conveyor belt between the drive pulleys 57 and 34 is substantially equal to the tension of the conveyor belt between the drive pulley 57 and the upper pulley 31. The material is placed in the hopper 38 for delivery to the upper run of the conveyor belt to move the material to the upper end for discharge over the end of the conveyor. While variation in the load will cause stretching of the conveyor belt, the idler roller 75 under tension of the springs 81 automatically takes up such stretch to maintain desired driving contact and friction between the belt and pulleys 57 and 34.

It is to be understood that while we have illustrated and described certain forms of our invention, it is not to be limited to the specific forms or arrangement of parts herein described and shown except insofar as such limitations are included in the claims.

What we claim and desire to secure by Letters Patent is:

1. In a portable conveyor, a boom having upper and lower ends, upper and lower guides on the boom and extending longitudinally thereof in substantially parallel relation, pulleys rotatably mounted at said upper and lower ends of the boom, the pulley at the lower end of the boom being a drive pulley, an endless conveyor belt operating on the upper guides and the lower run supported on the lower guides, the spacing between the upper and lower guides being substantially the diameter of the drive pulley at the lower end of the boom and less than the width of the belt, a frame having side portions secured to the boom and depending therefrom, guide rails on said frame side portions adjacent the lower guides and extending longitudinally of the boom, a second drive pulley rotatably mounted in the frame side portions below the boom and engaging the upper surface of the lower run of the conveyor belt, bearing members slidably mounted on the guide rails forwardly and rearwardly of the second drive pulley relative to the direction of travel of the conveyor belt, idler pulleys rotatably mounted in said bearing members, means on the frame side portions and engaging the bearing members for adjusting the idler pulleys to vary the tension of the belt and the arcuate engagement of the belt with the second drive pulley, a roller between the second drive pulley and the lower end of the boom, an arm pivotally mounted on the boom and carrying the roller for swinging the roller toward and away from the bottom surface of the lower run of the conveyor belt, adjustable tension means connected with the roller carrying arm for urging the roller toward the lower run of the conveyor belt to apply a predetermined pressure thereto to take up slack in said belt and substantially equalize the belt pressure on said drive pulleys, a prime mover, transmission means operatively connecting the prime mover to the drive pulley at the lower end of the boom for rotating same, and means operatively connecting said second drive pulley with the said drive pulley at the lower end of the boom whereby said drive pulleys rotate at the same peripheral speed and cooperatively drive the conveyor belt without differential slippage therebetween.

2. In a portable conveyor, a boom having upper and lower ends, pulleys rotatably mounted at said upper and lower ends of the boom, one of said pulleys being a drive pulley, an endless conveyor belt operating on the boom and over the pulleys at the upper and lower ends thereof and having upper and lower runs, said conveyor belt having substantially 180° of engagement with said drive pulley, a frame having side portions secured to the boom and depending therefrom, guide rails on said frame side portions extending longitudinally of the boom, a second drive pulley rotatably mounted in the frame side portions below the boom and engaging the upper surface of the lower run of the conveyor belt, bearing members slidably mounted on the guide rails forwardly and rearwardly of the second drive pulley relative to the direction of travel of the conveyor belt, idler pulleys rotatably mounted in said bearing members for rotation on axes above the axis of said second drive pulley, means on the frame side portions and engaging the bearing members for adjusting the idler pulleys to vary the tension of the belt and the arcuate engagement of the belt with the second drive pulley, said arcuate engagement of the conveyor belt with the second drive pulley being substantially 180°, automatic belt take-up means engaging the lower run of the conveyor belt between the second drive pulley and the drive pulley at the end of the boom to maintain substantially equal belt pressure on said drive pulleys, a prime mover, means operatively connecting the prime mover to one of said drive pulleys for rotating same, and means operatively connecting said second drive pulley with the drive pulley at the end of the boom whereby said drive pulleys rotate at the same peripheral speed and cooperatively drive the conveyor belt without differential slippage therebetween.

References Cited in the file of this patent
UNITED STATES PATENTS

| Re. 17,380 | Holzer | July 23, 1929 |
| 1,433,958 | Laughton | Oct. 31, 1922 |
| 1,497,619 | Waechter et al. | June 10, 1924 |
| 1,558,300 | Searles | Oct. 20, 1925 |
| 1,888,309 | Cramer | Nov. 22, 1932 |
| 2,490,538 | Newell | Dec. 6, 1949 |
| 2,592,915 | Lee | Apr. 15, 1952 |
| 2,663,404 | Peterson | Dec. 22, 1953 |
| 2,697,509 | Cushman | Dec. 21, 1954 |